(12) United States Patent
Schuette (10) Patent No.: US 6,912,467 B2
(45) Date of Patent: Jun. 28, 2005

(54) METHOD FOR ESTIMATION OF SIZE AND ANALYSIS OF CONNECTIVITY OF BODIES IN 2- AND 3-DIMENSIONAL DATA

(75) Inventor: John F. Schuette, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 120 days.

(21) Appl. No.: 10/641,579

(22) Filed: Aug. 15, 2003

(65) Prior Publication Data

US 2004/0068378 A1 Apr. 8, 2004

Related U.S. Application Data (60) Provisional application No. 60/416,863, filed on Oct. 8, 2002.

(51) Int. Cl.[7] ............................. G01V 1/30; G06K 9/00; H03M 1/08; C10G 5/02
(52) U.S. Cl. ........................... 702/14; 378/62; 367/43; 367/68; 382/130; 702/6; 702/7; 702/191
(58) Field of Search ........................... 702/6, 7, 14, 16, 702/69, 190, 191, 193; 367/43, 68, 57, 72; 378/15, 62; 382/128, 130; 600/410

(56) References Cited

U.S. PATENT DOCUMENTS

| | | | |
|---|---|---|---|
| 4,984,160 A | * | 1/1991 | Saint Felix et al. ........... 378/62 |
| 5,432,751 A | * | 7/1995 | Hildebrand .................. 367/72 |
| 5,757,663 A | | 5/1998 | Lo et al. .......................... 702/6 |
| 5,832,103 A | | 11/1998 | Giger et al. ................. 382/130 |
| 5,835,883 A | * | 11/1998 | Neff et al. ..................... 702/7 |
| 6,038,526 A | * | 3/2000 | Stein .......................... 702/191 |

OTHER PUBLICATIONS

U.S. Appl. No. 10/195,582, filed Jul. 15, 2002, Czernuszenko et al.

U.S. Appl. No. 10/408,597, filed Apr. 07, 2003, Alex Woronow et al.

Russ, John C. (ed.) (1995) "The Image Processing Handbook", Second Edition, CRC Press.

* cited by examiner

*Primary Examiner*—John Barlow
*Assistant Examiner*—John Le (57) ABSTRACT

A method for performing region growing in a data volume that accounts for noise in the data on a probabilistic basis. The data volume is divided into discrete cells, and a probability distribution for each cell's datum value is calculated. Each probability distribution is randomly sampled to generate one probabilistic, noise-free realization for the data volume, and region growing is performed using selected criteria. The process is repeated for different realizations until sufficient statistics are accumulated to estimate the probable size and connectivity of objects discovered.

17 Claims, 5 Drawing Sheets

METHOD FOR ESTIMATION OF SIZE AND ANALYSIS OF CONNECTIVITY OF BODIES IN 2- AND 3-DIMENSIONAL DATA

This application claims the benefit of U.S. Provisional Application No. 60/416,863 filed on Oct. 8, 2002.

FIELD OF THE INVENTION

This invention relates to the field of geophysical prospecting and, more specifically, to identifying and measuring contiguous features present in two-dimensional data images and three-dimensional data volumes, particularly those data related to petroleum exploration applications.

BACKGROUND OF THE INVENTION

Geophysical data such as microscopic images, (e.g. thin sections), wellbore images, and seismic data volumes are noisy. Geologic models of reservoir properties are uncertain. Techniques for measuring and analyzing contiguous features in these types of data can be extremely sensitive to such uncertainty. The current approach to measuring contiguous features in volumetric data is based on a technique called region growing, sometimes called seed detection. See, for example, Russ, John C., *The Image Processing Handbook*, Second Edition, CRC Press 1995. The user specifies (1) a starting voxel, $v_0$, assumed to be located in some feature of interest, and (2) a voxel eligibility criterion, E, which defines whether a voxel should be considered part of the feature of interest. E is usually a function of the voxel's observed value. The region of interest, R, is initialized to be the specific starting voxel. A computer algorithm then iteratively examines all voxels adjacent to R and adds them to R if they satisfy E. When no more voxels can be added to the region, the algorithm stops, having identified all voxels that satisfy E and are connected to $v_0$ by other satisfying voxels. Thus, to be included in the region, voxels have to be both eligible (by satisfying E) and connected to $v_0$ by at least one path through other eligible voxels. A petroleum industry example of this technique is described in U.S. Pat. No. 5,757,663 to Lo, et al. The application described by the Lo patent treats connectivity in a reservoir model, not in observed data such as seismic data, and does not address the issue of uncertainty in the model.

A frailty with the region growing approach lies in the fact that noise in the voxel values can produce erroneous decisions with respect to E. Geographically narrow features can be cut by a small amount of noise that prevents the addition of otherwise qualified voxels. Adjacent, but distinct, features can be joined by a small amount of noise that lets bridges form between distinct objects.

Practitioners commonly employ two approaches to mitigating these problems: filtering the data and modifying the value criterion. In the former, a smoothing operator (e.g., mean or median filter) is applied in an attempt to remove this noise. This approach tends to destructively modify voxels around the interfaces that may be important. In the latter, the user performs a number of separate analyses across a range of eligibility criteria. This approach essentially considers the data as noise-free and the threshold value uncertain. One example of this approach is described in U.S. Pat. No. 5,832,103 to Giger, et al. A petroleum example of the second approach is U.S. patent application Ser. No. 10/195,582 filed Jul. 15, 2002. Neither the filtering nor the varying-eligibility approach admits the possibility that the character of the noise may vary from location to location in the volume. Neither approach characterizes the uncertainty in the result (e.g., uncertainty in body size or connectivity between bodies).

Some image-segmentation strategies that are well behaved in the presence of noise (e.g., level set techniques) could be applied to connectivity analysis problems, but they too are deterministic. They do not communicate the range of possibilities given the noise in the data.

The above-described technologies are based on established image-processing techniques. They address connectivity and size, but not uncertainty. There are uncertainty-aware techniques for estimating the connectivity and size of a geologic body in 3-D that are not based on image analysis. These use Monte Carlo techniques to produce multiple realizations of a geologic model that "honors" modeled uncertainty in stratigraphy, object geometries, rock properties, and other model variables. The difference between these techniques (embodied in the JACTA add-in to the commercial software product, "gOcad", to name one example) is that the uncertainty in connectivity and size is a side effect of the integration of many forms of uncertainty, some of which are rarely adequately characterized or integrated. In other words, the uncertainty in connectivity and size is attributed to the secondary effects of modeling uncertainties, not directly to the primary source of uncertainty: the noise in the observed data. What is needed is a technique that directly estimates uncertainty in connectivity and size from the measured statistical properties of a densely sampled dataset. The present invention satisfies this need.

SUMMARY OF THE INVENTION

In one embodiment, the present invention is a method for determining the size and possible connectivity between seismic objects in noisy seismic amplitude or attribute data volumes on a probablistic basis, comprising the steps of: (a) subdividing the data volume into cells called "voxels"; (b) calculating a probability distribution for each voxel's datum value; (c) randomly sampling each voxel's probability distribution to generate a "realization" comprising a noise-free datum value for each voxel; (d) using conventional region-growing to grow a body that contains a selected starting voxel and wherein all voxels satisfy a selected eligibility criterion; and (e) repeating steps (c)–(d) until the accumulated realizations allow the user to assess the probable size of a body and whether it is probable that the body is in fact a single, connected body as contrasted with multiple, unconnected smaller bodies.

In other embodiments, bodies may be identified in a given realization without selecting a starting voxel and growing the body progressively from there. In such embodiments, each voxel is checked against the eligibility criterion, and regions of connected voxels satisfying the eligibility criterion are identified.

In addition to seismic amplitudes or attribute data, seismic facies data may also be used. However, the present invention's usefulness is not limited to seismic applications. It can be used to assess "objects" in any data volume affected by noise.

The present invention may also be applied to assess features in two-dimensional data sets.

In preferred embodiments of the present invention, the probability distribution of step (b) above will be determined by analyzing and modeling the noise in the data volume. Enhanced Markov Chain Characterization is a preferred method for calculating these probability distributions in the present invention, and for generating the random realizations in step (c).

In preferred embodiments of the present invention, the distributions calculated in step (b) above are adjusted to take spatial correlation into account.

The present invention is readily suitable to automation through computer programming, where its intrinsic parallelism allows speed-up through the use of multiple parallel processors.

BRIEF DESCRIPTION OF THE DRAWINGS

The patent or application file contains at least one drawing executed in color. Copies of this patent or patent application publication with color drawings will be provided by the Office upon request and payment of the necessary fee.

The present invention and its advantages will be better understood by referring to the following detailed description and the attached drawings in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents which are included within the spirit and scope of the invention, as defined by the appended claims.

DETAILED DESCRIPTION OF THE PREFERRED EMBODIMENTS

The present invention applies equally to two-dimensional images and three-dimensional volumes. The description that follows will be based on application of the invention to three-dimensional volumes, and will use the term "voxel" to refer to a cell in three-dimensional space. The terms "image" and "pixel" may be substituted for "volume" and "voxel" throughout the following description to convert the terminology toward two-dimensional applications. Similarly, the present invention is often discussed below in terms of its seismic applications although it is not limited to seismic applications. A data volume may be called a "seismic attribute cube" or similar term, where "cube" is used for convenience without regard to whether its sides are equal or its voxel subdivisions are uniform in all three dimensions. A body may be described as a region of connected voxels in, for example, an acoustic impedance data volume characterized by each voxel in the region having a value of acoustic impedance greater than (or less than) some selected threshold value (the "eligibility" criterion) such that no neighboring voxels of the region meet the eligibility criterion. A definition of "neighbor" or "adjacent" is implied and must be chosen. Typically, the definition chosen is that a voxel is adjacent to, or neighbor to, another voxel if they share a face.

The present invention, referred to herein as Probablistic Region Growing ("PRG"), requires the integration of three elements:

a) a technique for calculating the probability distribution for the value of each voxel;

b) a method of using the probability distributions to generate random realizations of the data volume;

c) repeatedly applying the traditional, deterministic region growing technique described above to the realizations generated in element (b).

The key distinction between PRG and traditional region growing ("RG") is that PRG treats the decision to add a particular voxel into the growing region as a probabilistic decision. This effect is obtained by applying RG independently to many stochastic realizations of the data volume and accumulating the results to produce a probabilistic description of the size and connectedness of the feature(s) of interest.

The following describes one embodiment of the present inventive method as applied to the identification of bodies in a seismic attribute cube:

1. Select a body of interest, G, in a seismic attribute cube, A. This can be done by visual inspection of A by any seismic interpreter of ordinary skill.

2. Specify a starting voxel, $v_0$, inside A. This can be done by visual inspection of A by any seismic interpreter of ordinary skill.

3. Define an eligibility condition E. This is a criterion for deciding whether a voxel is eligible to be added to a region grown from $v_0$. This usually involves specifying some particular voxel values or range of values to be of interest. Where the attribute has numerical values, the eligibility criterion will usually be a mathematical inequality.

Example I: In a seismic-amplitude cube with 8-bit values (0–255), the interpreter may be interested in "low-amplitude" voxels: for example, those with values of 99 or less.

Example II: In a seismic-facies cube, interpreters might be interested in voxels that belong to regions of "high amplitude, continuous" character.

4. For each voxel, $v_1$, in A, calculate $P_i$: the probability distribution of the attribute value at that location. This produces a cube of probability distributions, P. This step preferably exploits an application-dependent model of the uncertainty of the voxel's data values.

Example I: In the seismic-amplitude case, one needs to calculate the probability distribution for the amplitude value of each voxel. This can be done by deriving a model of the noise in the seismic data and using it to develop the needed probability distribution.

Example II: In the seismic-facies case, one needs to calculate the probability that each voxel is of each seismic-facies type. If the seismic-facies cube was generated by a statistical classification process, the required probability distribution will have been generated by that process.
5. Construct a tally cube T. This is the same size as A and is initialized to all zeros. This will be used for bookkeeping in step 8.
6. Construct an empty size vector S. This will be used for bookkeeping in step 8. The size vector is a one-dimensional array of m whole numbers where m is the number of different realizations, i.e., repeats of steps 7 and 8, that are generated in step 9 below. The $n^{th}$ number in the array is the size of (i.e., the number of voxels in) the object resulting from the $n^{th}$ realization.
7. Generate a random realization, $A_R$, of A based on P. This amounts to randomly sampling each voxel's distribution $P_i$, which was calculated in step 4. To visualize this step, one may think of a wheel of fortune or similar spinning wheel in a game of chance. On the wheel, each possible value of the attribute (for the given voxel) is represented by a pie-wedge sector, the size of the wedge being proportional to the probability for that attribute value. The wheel is set into motion vigorously enough to make its eventual stopping point random.
8. Perform a RG operation in $A_R$, starting from $v_0$, and using the eligibility criterion, E, defined in step 3. Every time a voxel is added to the growing region, increment (i.e., increase by 1) the corresponding voxel in T. When the RG operation is completed for this realization, append the size of the resulting object to S.
9. Repeat steps 7 and 8 until some application-defined stopping criterion is met. After each iteration of steps 7 and 8, the values in T represent the current estimate of the probability, $P_c$, that each voxel is connected to $v_0$, given the noise level in the data and the eligibility condition E defined in step 3. If n iterations of steps 7 and 8 have been performed, $$P_c \cong \frac{T}{n}.$$

After each iteration of steps 7 and 8, the current value of $P_c$ can be examined and used to make a stopping decision. For example, if the user's primary interest is obtaining the probability that there is some connected path between two voxels, $v_0$ and $v_1$, a reasonable stopping criterion might be that the estimate of this probability, $P_c$, at location $v_1$ vary by less than 5% over the course of the last 100 iterations.
10. Terminate: At termination, the values in S represent the probability distribution for the size of the object G, given the noise level in A and the eligibility condition E defined in step 3.

Following is further explanation of certain aspects of the present invention.

Selecting $v_0$ (Step 2): In some applications, it is possible to specify $v_0$ through some automatic analysis of the volume. Furthermore, with straightforward bookkeeping, this method can be extended to probabilistically grow multiple objects simultaneously in the same cube. To do this, more than one starting point would be specified either by the user or by some automatic analysis of the volume.

$P_i$ calculation (Step 4): The preferred method for calculating $P_i$ is Enhanced Markov Chain Characterization (EMC²), which is disclosed in U.S. patent application Ser. No. 10/408,597 filed on Apr. 7, 2003. EMC² produces a probability distribution for the true value of a particular voxel given the observed values of its neighbors and the statistical description of the spatial variability of the data. An advantage of this noise model is that it allows for varying noise characteristics across the volume. A description of EMC² is provided in the appendix hereto.

Building $A_R$ (Step 7): Preferred embodiments of the present invention take into account spatial correlation when generating the realizations. Specifically, the value realized for each voxel in step 7 above should be affected by how its neighbors were realized. For example, if a particular voxel, $v_i$, has been realized toward the high end of the attribute range, it is usually desirable for an adjacent voxel, $v_i+1$, to be more likely realized toward the high end of the range than toward the low end of the range. EMC² provides the information required to construct such conditional realizations.

A further refinement of step 7 is based on the observation that there is no point in realizing voxels that are never considered to be added to the region being grown. In other words, the realization step should be deferred for each voxel until the region has grown to be adjacent to that voxel.

Managing the overall process: As described above, the process is serial. There are numerous opportunities to parallelize an implementation of this process on suitable computer hardware. Such a characteristic is called intrinsic parallelism. Depending on the method used to calculate $P_i$, the calculations performed within steps 4 and 7 can be executed in parallel. The iterations of steps 7 and 8 can be executed in parallel.

Efficiencies such as parallel processing are important for the present invention. In the following example problem, 1020 realizations were run on four processors. It is estimated that if the same problem had been run on a single 800 MHz processor (PC or workstation), it would consume approximately 650 hours. However, 1020 realizations are far more than would be needed in a typical problem for the analyst to pin down the points of interest. In this spirit, the following example was attempted again (not shown herein), and useful distributions were obtained from 100 realizations, requiring approximately 35 hours on two CPU's. Memory requirements may be approximated by that amount sufficient to store the original cube, or data volume, multiplied by 3. In the following example, that estimated number is 3×151× 801×501×1 byte/voxel≅182 million bytes.

Example: Connectivity in Seismic Amplitude Data

This example shows application of the present inventive method to analyze the uncertainty in the size of a body connected to a particular voxel in a seismic amplitude cube.

Input parameters: The data volume, A, is a seismic amplitude cube with amplitude values ranging from 0–255. A has 151 slices in the inline (x) direction, 801 slices in the crossline (y) direction, and 501 slices in the time (z) direction.

The seed point, $v_0$, is located at (x,y,z)=(100,680,88).

The eligibility criterion, E, specifies that eligible voxels must have amplitude values less than or equal to 99.

Figure 1A:
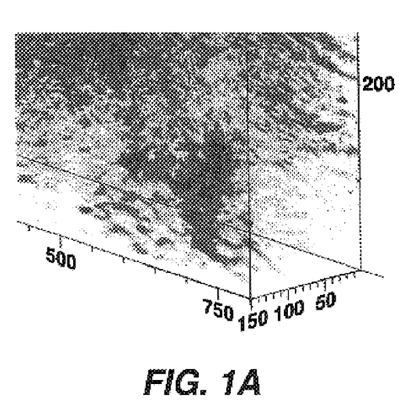
FIGS. 1A and 1B illustrate two perspective views of a three-dimensional input data volume for an example problem, with lower data values shown as more opaque to highlight potential bodies of interest.
Figure 1B:
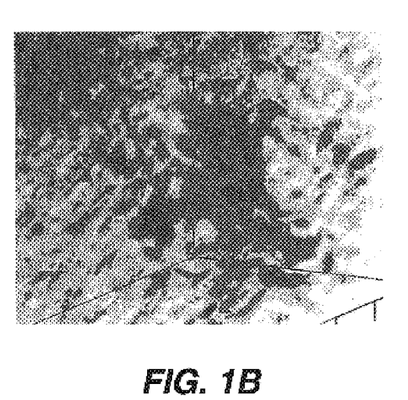

FIGS. 1A and 1B show A perceived from two different viewpoints. Higher amplitude values of A are rendered progressively less opaque to suggest the kinds of features of interest, with interest being proportional to opacity in this example. Noise is evident in the image, from its irregular, fragmented nature.

Figure 2A:
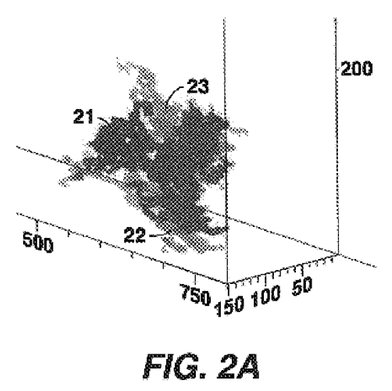
FIGS. 2A and 2B illustrate two perspective views of a three-dimensional tally cube used to accumulate results from multiple random realizations of the data of FIGS. 1A and 1B after a probabilistic characterization of the noise in those data.
Figure 2B:
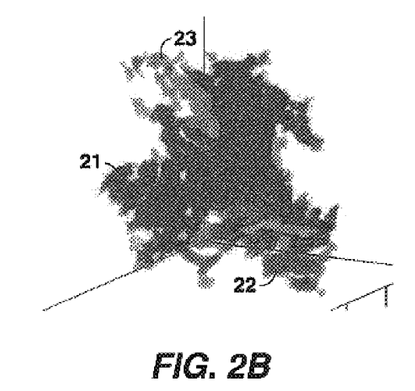

Results: FIGS. 2A and 2B show two views of one output of PRG when applied to this dataset. This output is the final state of the tally cube T. Voxels more likely to be connected to $v_0$ are rendered in warmer colors. This result was obtained by running 1020 iterations of steps 7 and 8 of the ten-step embodiment of the present inventive method detailed above.

Figure 3:
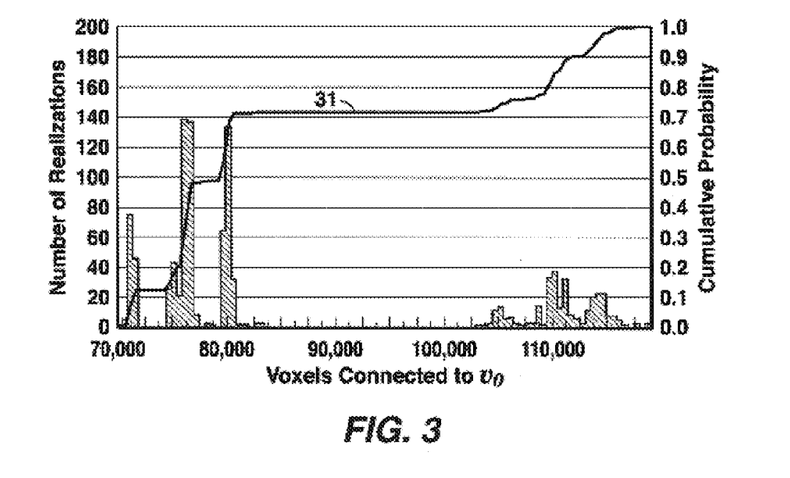
FIG. 3 is a graph showing the probability distribution of object sizes generated by the present invention for the example problem.

FIG. 3 shows the frequency distribution of the size of the bodies connected to $v_0$ over all realizations. This is derived from the final value of the S size vector. The curve 31 is the cumulative distribution.

The distribution in FIG. 3 can be roughly interpreted. In general, the peaks of the distribution correspond to families of sub-bodies. Their sizes can be deduced from their placement along the horizontal axis and their probability of being connected to $v_0$ can be deduced by their impact on the cumulative probability curve.

By examining the high-level groupings of peaks in the distribution, one can see that there is roughly a 70% chance of having 70,000–85,000 voxels connected to $v_0$ but roughly a 30% chance of having 100,000–120,000 voxels connected to $v_0$. (The smaller configuration corresponds closely to the result from RG discussed below.)

A slightly more detailed possible interpretation of FIG. 3 is shown in Table 1. In general, such interpretations should be confirmed through detailed examination of the tally cube T. (See the discussion below of FIGS. 4A, 4B, and 5.)

TABLE 1

One possible interpretation of FIG. 3.

| Sub-body | Approximate Size | Inferred From |
|---|---|---|
| 0 | 71,000 | First peak (from left) |
| 1 | 5,000 | Second peak |
| 2 | 4,000 | Third peak |
| 3 | 35,000 | Three peaks at right, widely separated from |

Processing Details: The following summarizes the processing details of the example.

One $v_0$ was selected manually.

P was calculated using the $EMC^2$ approach for calculating probability distributions for the amplitude value at each voxel.

$A_R$ was built by realizing individual voxels conditionally on their neighbors' realized values.

Voxels were not realized unless and until the region grew to be adjacent to them.

The different realizations (iterations of steps 7 and 8) were conducted in parallel on different computers.

Figure 4A:
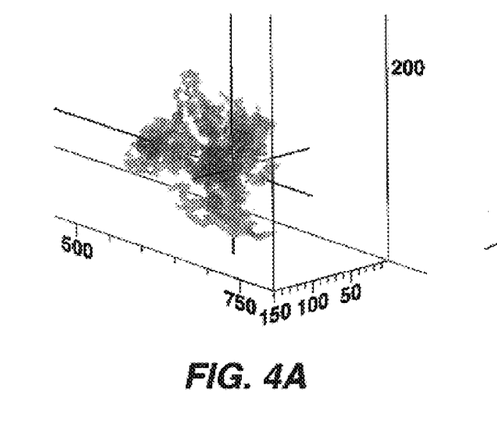
FIGS. 4A and 4B illustrate two perspective views of the same example problem after conventional region growing is applied using the same eligibility criterion.
Figure 4B:
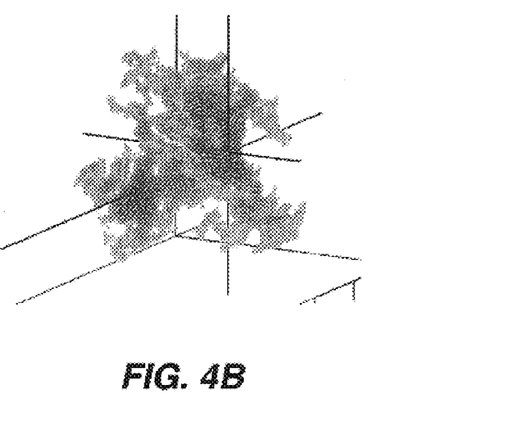

Comparison to RG: FIGS. 4A and 4B show two views of the result of RG when applied to A with the same eligibility criterion, E. The intersecting lines indicate the location of $v_0$. The resulting size of the object is 74,081 voxels which compares well to the smaller of the two major possibilities obtained by PRG.

It is instructive to compare the RG result (FIGS. 4A and 4B) to the PRG result (FIGS. 2A and 2B). In FIGS. 4A and 4B, the opacity of the rendering reflects the seismic amplitude value, with lower amplitudes rendered more opaque. In FIGS. 2A and 2B, the color of the rendering reflects only the number of realizations that include a particular voxel. The body labeled 21 is dark red indicating that it is the core body. The PRG case clearly shows an additional potentially connected body 22 below 21. Its light blue color indicates that it has a slight chance of connection to $v_0$. A third body, 23, may be identified higher than the core body. Its light red color indicates that it has a good, but not certain, chance of being connected to $v_0$. In the RG result, this body is deemed connected, but the PRG result shows there is some uncertainty.

The information available from RG (FIGS. 4A and 4B) may be compared to the PRG information portrayed in FIGS. 2A, 2B and 3 and Table 1. RG produces no information about the uncertainty or robustness of the results with respect to body size or the connectivity of potential bodies. Instead, RG generates a monolithic body whose internal connections may be either strong or tenuous. Table 1 is consistent with FIGS. 2A and 2B. Sub-body 0 from Table 1 is core body 21 in FIG. 2A. Sub-body 1 and/or sub-body 2 is body 23, and sub-body 3 is body 22.

It is not uncommon for petroleum reservoirs' size estimates to "grow" as more is learned about them. One contributing factor for this phenomenon is the difficulty in incorporating seismic-data uncertainty into geometrical analysis of the reservoir. The present invention provides one way to quantify the impact of this uncertainty. In fact, the preceding example illustrates a case where there is a 30% chance that the reservoir is 50% larger than estimated by the traditional RG technique.

Figure 5:
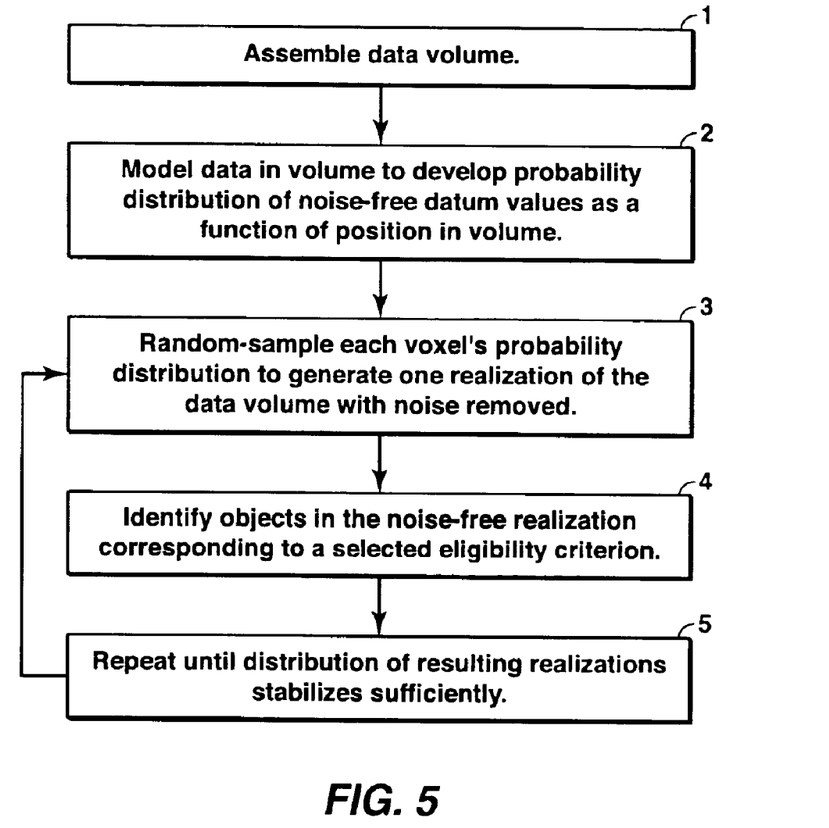
FIG. 5 is a flowchart illustrating the major steps of the present inventive method.

The present inventive method may be summarized in the flow chart of FIG. 5 to encompass a broader spectrum of its possible embodiments than might be inferred from the preceding ten-step embodiment.

At step 1, a data volume is assembled, i.e., a value of some measured quantity (or descriptor of some observed aspect) is assigned to each spatial cell, or voxel, the value being what was measured at that spatial location. Alternatively, the data can be derived from a measured quantity, as in a seismic attribute data volume. In any case, the data are known or suspected to contain noise which renders uncertain any object identification or connectivity determination.

At step 2, the data are analyzed so as to calculate the probability distributions for the signal component (the measured value minus the probable noise component) at each voxel. Noise can be estimated for such purposes by comparing data values for adjacent voxels on the assumption that the true data are smoothly varying. In some instances, adequate results may be obtained by assuming a constant noise distribution such as noise being a fixed percentage of the datum value independent of spatial position. A much more sophisticated statistical model of the noise impact is the previously referenced Enhanced Markov Chain Characterization method.

At step 3, each voxel's probability distribution is randomly sampled to generate a data volume corresponding to one possible scenario, or realization, of the original data with noise removed. $EMC^2$ is particularly adapted to generating random realizations. At step 4, objects are identified in the realized data volume based on a selected threshold, or eligibility criterion. This may be done by region growing as described previously, i.e. selecting a starting voxel and then systematically examining neighbors and thereby continually expanding, or growing, the object until no more neighbors can be found that meet the eligibility criterion. Or, every voxel can be tested for eligibility and then those contiguous voxels that meet the criterion are checked against a minimum-object-size threshold. The end result of this step will be the objects corresponding to the chosen eligibility criterion and the particular realization.

At step 5, steps 3 and 4 are repeated to generate as many additional realizations as the user may want, depending on the features of concern as explained previously.

All descriptions herein are directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

Appendix: Enhanced Markov Chain Characterization

A Markov chain is a probabilistic model describing successive states of a system. Given the present state, the next state in the future does not depend upon the past states, but only upon the present state. Thus, in a Markov chain, the probability of a transition to future state $S_{i+1}$ from a previous chain of states $S_1, S_2, \ldots, S_i$, is given by $$Pr(S_{i+1}|S_1, S_2, \ldots, S_i) = Pr(S_{i+1}|S_i),$$

where $Pr(A|B)$ represents the probability of the occurrence of state A given the existence of the state, or set of states, B.

Ordinary Markov chains describe successive states of a system. For instance, the successive states could be used to describe the time succession of the number of tasks queued for computer processing. Markov chains can also describe successive states of a system in space rather than in time. The descriptions of state successions for a Markov process are encoded in a transition probability matrix. As its name implies, the transition probability matrix contains the probability of going from any specified state to any other state in the next time or location step.

Applications to one-dimensional data dominate the published methods of using Markov chains in the analysis of spatial data for geologic systems. One common example involves the analysis of the lithologic (rock type) succession of a geologic section. One benefit is that the data from which the Markov chain is constructed are not noisy. However, the exact lithologies must be presumed to be known in geologic models using Markov chains, a limitation of the method.

Markov chain analysis has been applied to sparse well data. However, this application does not include the capability to evaluate the uncertainty in the observations, which must therefore be presumed to be error-free. The modeling results from ordinary Markov chain analysis therefore are limited by inability to allow evaluation of alternative descriptions for noisy data.

Extended Markov Chain Characterization, or $EMC^2$, is an extension of ordinary Markov chain analysis and is a method for analyzing noise in seismic data. The method is applicable to geographically distributed data. The method takes the noise level of the data into account; facilitates characterizing both signal and noise components in the data; quantifies uncertainty that results from the presence of noise; and provides a basis for producing realizations that reflect the signal and uncertainty in the observed data.

Figure 6:
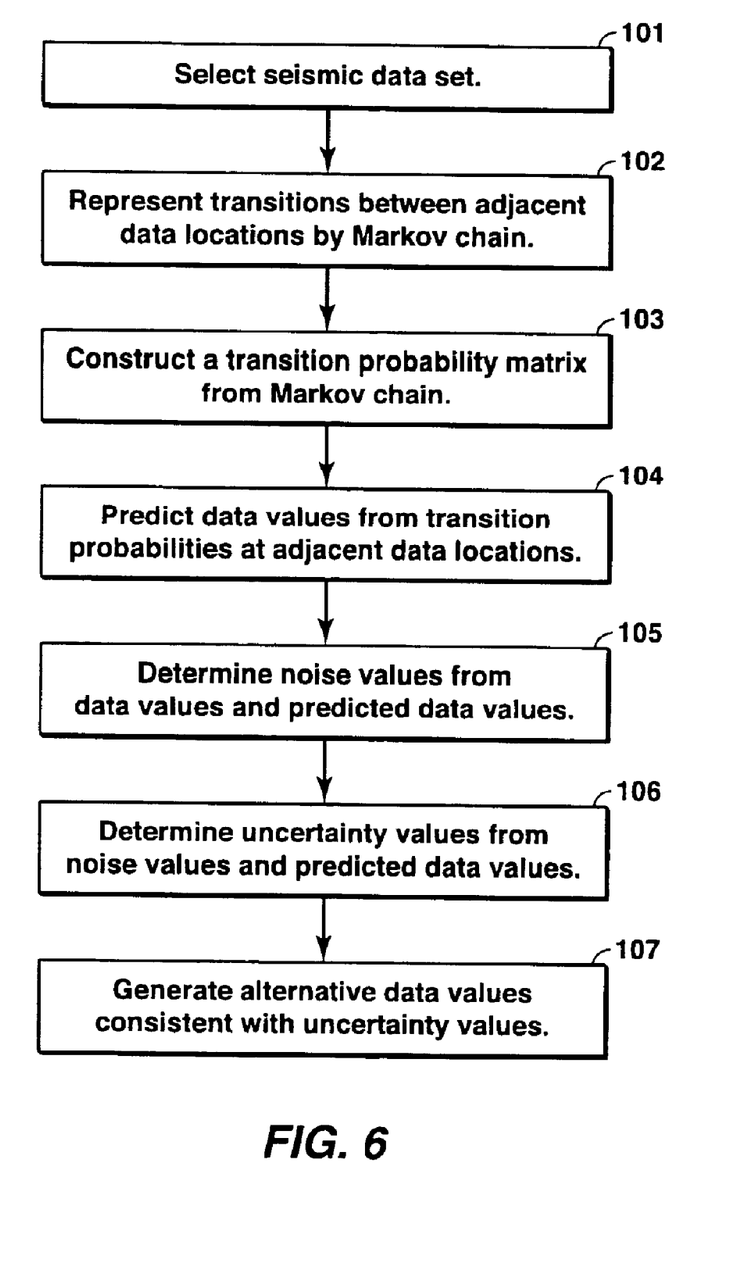
FIG. 6 is a flowchart illustrating the major steps in an embodiment of the Extended Markov Chain Characterization method.

FIG. 6 is a flow chart illustrating the processing steps in an embodiment of $EMC^2$. First, in step 101, a seismic data set is selected for analysis. As will be understood to those skilled in the art, the seismic data will preferably comprise seismic data values corresponding to various receiver locations, as is typically obtained in seismic surveys. The seismic data values preferably comprise either seismic amplitude data or seismic attribute data. Examples of seismic attribute data include amplitude values along a set of seismic traces, two-way travel time to a specified reflector across a 3-D survey, and average trace amplitude in cells of a 3-D seismic cube. The $EMC^2$ method may be applied to seismic data collected from either land or marine surveys. The noise in the seismic data set may have unknown spatial and statistical properties. As will be understood to those skilled in the art, the vertical coordinate in a seismic data set may be represented as a spatial or a temporal parameter; references to either parameter in the following are not intended to be limiting.

The $EMC^2$ method is most effective in signal identification and noise removal for data having more that one spatial dimension, but is not restricted to multi-dimensional data. The method is preferably applied to flattened data such that the horizontal spatial dimensions (in other words the x and y directions) lie in a plane of apparent bedding.

In step 102 of FIG. 6, transitions between data values at adjacent data locations in the seismic data set selected in step 101 are represented by a Markov chain. Markov chains probabilistically describe the transitions between successive states of a system. In a first-order Markov chain, the probability of a transition to a particular state depends only upon the value of the single immediately preceding state. Higher-order Markov chains consider dependence upon more distant states. The following description and example applications of the present invention are limited to use of first-order Markov chains, but the $EMC^2$ method is not limited to first-order applications. In the $EMC^2$ method, the states of the system correspond to the data values in the seismic data set. The transitions between successive states correspond to the transitions between adjacent data locations. Preferably, the data are sufficiently dense such that the transition probabilities may be well defined. Small data sets, implying limited spatial sampling, may have poorly estimated transition probabilities, which may lead to an inadequate data model and reduced accuracy in the analysis result.

In step 103 of FIG. 6, a transition probability matrix is constructed from the Markov chain representation from step 102. The transition probability matrix encodes descriptions of the state successions in the Markov chain process. The transition probability matrix contains the probabilities of going from any specified state to any other succeeding state in the seismic data set. The invention is preferably applied to the seismic data in stages wherein regions of regularity are identified and analyzed separately. This approach enhances the capability to capture spatially varying noise.

Figure 7:
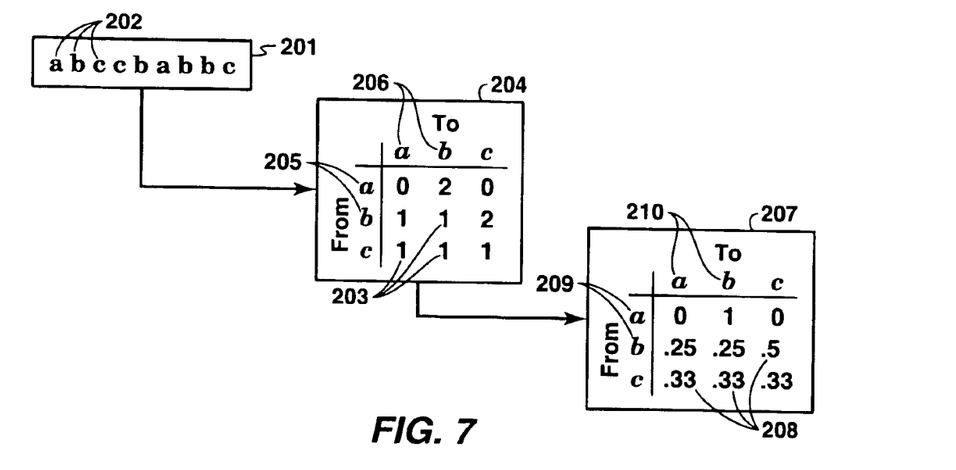
FIG. 7 is an example of a Markov chain, illustrating the construction of its transition probability matrix.

FIG. 7 shows an elementary one-dimensional example of a Markov chain and a preferred method of construction of its transition probability matrix. A train 201 of state transitions represents data for the Markov chain. Each state 202 is indicated by a letter in train 201. For example, the first state 202 in train 201 is the letter a. The second state 202 in train 201 is the letter b. Transitions between states are recorded as entries 203 in a tally matrix 204 that indicates the number of times a given state is followed by another state, where the analysis proceeds from left to right in train 201. Tally matrix 204 is constructed such that an entry 203 in the $i^{th}$ row 205 and the $j^{th}$ column 206 corresponds to the number of transitions from the $i^{th}$ state to the $j^{th}$ state in train 201. For example, train 201 has no occurrences of state a being followed by succeeding state a, and therefore the entry for the 1st row 203 and the first column 206 is zero. Similarly, train 201 has two occurrences of state a being followed by succeeding state b, and the corresponding entry in tally matrix 204 is a two. Entries 203 in tally matrix 204 are then normalized by rows 205 to construct a transition probability matrix 207. Each entry 208 in the $i^{th}$ row 209 and the $j^{th}$ column 210 of transition probability matrix 207 is the probability of the transition from the $i^{th}$ state to the $j^{th}$ state. Accordingly, each row 209 in the transition probability matrix 207 is a probability vector.

Although the above example is one-dimensional, in other words train 201 is a single sequence of states, the concept may be extended to other applications, such as, but not limited to, two or three spatial dimensions, or to three spatial dimensions plus a time dimension. To define successive states in higher dimension data, a directionality convention must also be defined. The convention to be employed herein, and illustrated for three spatial dimensions, is that positive directions indicate the succession sequence. For example, a three-dimensional volume element state at [x,y,z] is succeeded in the x direction by the state [x+1,y,z], with similar notation for the y and z directions. Therefore, if the average trace amplitude in [x,y,z] is the current state of the system, then the average trace amplitude at [x+1,y,z] is the succeeding state in the x direction.

Two advantages derive from the $EMC^2$ method's use of Markov chains to develop transition probability matrices. First, many geologic processes create features with a high degree of spatial regularity. In some cases, that regularity simply may be due to the long-distance persistence of a feature of the signal or due to a slow and regular change in the signal. In other cases, it may be a series of abrupt, repeated transitions from one type of signal to another, and ultimately back to the original signal. Examples include extensive beach and delta deposits, large vertical successions of depositional cycles at various scales, and geographically extensive erosional surfaces. Seismic data commonly capture the signatures of these types of features and those seismic signatures inherit the regularity. Markov chains can model these types of regular behavior.

Second, the regular behavior produced by geologic processes may often generate a Markov chain wherein a particular state at a location x will have a limited number of states to transition to at location x+1. If the transition from state x to x+1 is a low probability event, and the transition from state x+1 to state x+2 is also a low probability event, then state x+1 may be suspected as being in error, for example as having a high degree of noise. In other words, state x+1 is behaving in a manner not consistent with the dominant regular behavior of the geology as captured by the seismic data and the Markov chain, and the subsequent analyses and alternative realizations may take that inconsistency into account.

Figure 8:
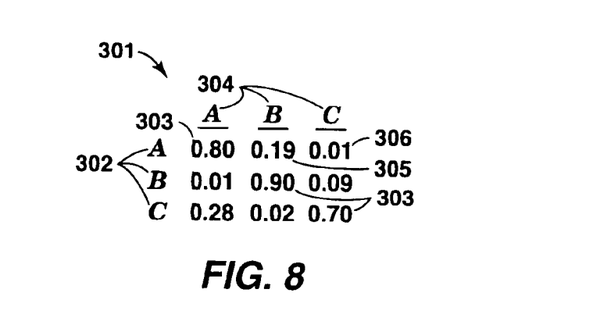
FIG. 8 is an example of a Markov chain transition probability matrix.

FIG. 8 shows an example transition probability matrix 301 for a Markov chain. Transition probability matrix 301 is indicative of a very systematic or regular system. For instance, each state 302, once achieved, has a tendency to persist in that same state. This tendency is indicated by the largest probability values being on the diagonal 303 of the transition probability matrix 301. Furthermore, when a transition occurs out of a state 302, there is a favored alternative end state 304. For example, as between state B and state C, the transition from state A is more likely to be to state B 305 than state C 306, as indicated by the larger probability value 0.19 as compared to the transition probability from A to C of 0.01.

In an alternative embodiment, the transition probabilities can be estimated directly from the seismic data set selected in step 101. In a further alternative embodiment, the transition probabilities can be estimated from any available geologic data such as, but not limited to, outcrops, well logs, bore holes, seismic surveys, processed derivatives of any of the above data, or information derived from data taken in geologically similar areas.

In step 104 of FIG. 6, predicted data values for data locations in the seismic data are determined from the transition probabilities for transitions from adjacent data locations. The transition probabilities for transitions from the adjacent locations are used to calculate the uncertainty of the observed value at the location and to calculate its expected value by the Markov chain. A preferred method of calculating this uncertainty will be explained in detail below in the context of FIG. 9 and Equations (1) and (2).

In step 105 of FIG. 6, noise values are determined for data locations in the seismic data from the corresponding predicted data values determined in step 104 and the data values at the data locations. The noise values are preferably determined by subtracting the predicted data values determined in step 104 from the data values at each data location.

In an alternative embodiment, step 106, uncertainty in the seismic data may be optionally determined from the transition probabilities for transitions from adjacent locations. This calculation is described in detail in the context of Equation 2, below.

In a further alternative embodiment, step 107, random realizations may be optionally generated. Such random realizations could for example involve a plurality of alternative data values that are consistent with the uncertainty in the seismic data determined in step 106. This alternative is further described below in the context of Equations (3) and (4).

Mathematical Foundation:

The $EMC^2$ method addresses the processing and interpretation of seismic, including electro-seismic, data, particularly in regards to evaluating data quality, remediating low-quality data, quantifying uncertainties in data and its products, and facilitating improved understanding of models that are derived from data. Regression analysis is one well-known approach for modeling uncertainty in a dataset, and will be used to demonstrate the approach taken by the method of the present invention. The use of a regression analysis example, as well as the description and derivation of the equations included in the following, are for demonstration purposes only and are not limitations of the $EMC^2$ method.

Figure 9:
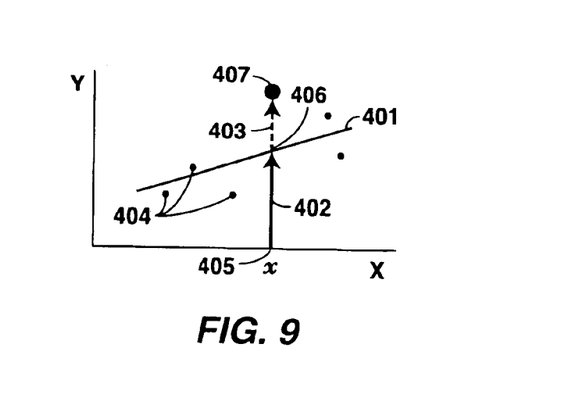
FIG. 9 is an example of a fitted straight line regression model, illustrating the separation of signal from noise.

FIG. 9 shows a regression model 401 that has been derived from a set of data 404. Data 404 comprise a family of observations, each of which individually comprise noise and signal components. Model 401 is a straight line that is assumed to represent the signal 402 present in the data 404 at any given point along model 401. As is understood in the art, the model's slope and intercept are determined by contributions of information from each of the observations in data 404. At any given value of x 405, the best estimate of the corresponding y is given by the value 406 of the model 401 at that x 405. The uncertainty in estimate 406 depends on the amount of scatter inherent to data 404 with respect to model 401.

For any given x 405 at which an observed data point 407 is available, the difference between the model 401 y value 406 and the observed value 407 is assumed to be the noise 403 in that observation 407. Model 401 captures the signal 402 and the residual difference captures the noise 403. The $EMC^2$ method employs an analogous process for separating signal from noise that applies to noisy, geologic, spatial data.

With reference again to the transition probability matrix 301 in FIG. 8, the variable $\tau_{i,j}$ will be used in the following to indicate the transition probability of going from starting state i (302 in FIG. 8) to ending state j (304 in FIG. 8). Assume for example that the state transitions from locations x through x+1 to x+2 are represented by the states A→C→A. It is well known in the art that the probability of this two state transition can be given by $$Pr(A \to C \to A) = \frac{\tau_{A,C}\tau_{C,A}}{\sum_{i=A,B,C} \tau_{A,i}\tau_{i,A}}. \tag{1}$$

For transition probability matrix 301 in FIG. 8, the calculations in Equation (1) give a transition probability Pr(A→C→A) of approximately 0.0043. Under the assumption that the data are measured on a system exhibiting a high degree of spatial regularity, this low value provides reason to suspect that the observed state, C, at the location x+1 is dominated by noise. In other words, the low probability associated with state C as the transition between two states A suggests that the measurement value for that state is noisy, and that the value does not accurately portray the signal component for the state. The EMC$^2$ method provides a mechanism for quantifying that low probability and for establishing an improved estimate of the signal for that state.

The EMC$^2$ method therefore addresses the question: "If state C at x+1 is a noisy value, what is the noise level and what is the signal most likely to be?" This question is addressed by rewriting Equation (1) as $$Pr(A \to S \to A) = \frac{\tau_{A,S}\tau_{S,A}}{\sum_{i=A,B,C} \tau_{A,i}\tau_{i,A}}, \quad (2)$$

where the variable S is an unknown that may represent any of the individual state values A, B, and C. Equation (2) yields the following probabilities for the three possible state values of variable S:

$Pr(S=A)=0.993$, $Pr(S=B)=0.0029$, $Pr(S=C)=0.0043$.

Equations (1) and (2) involve a process of probabilistically analyzing the contents of a central location from an adjacent location and is referred to in the following as "neighbor voting". The process of neighbor voting allows the method of the present invention to construct a data model, an analog to the straight line regression model 401 in FIG. 4, and to thereby determine estimates of signal 402 from noise 403 at any location.

Specifically, if states A, B, and C are numerically valued, the probabilities calculated from Equation (2) can be used to obtain an expected numerical value for S. For example, assume that the states were binned (or discretized) into values of a seismic attribute covering the following ranges:

$0<A \leq 1$, $1<B \leq 3$, and $3<C \leq 7$ units.

For this example, further assume that the observed value of a state corresponds in all cases to the center points of the intervals. For example, an observed value of C in the sequence of states A→C→A would be five. Using Equation (2) and the center points of the intervals, the expected value of S is 0.5238 units, which results from the sum of the product of the center value of each interval with the probability associated with that interval, in other words (0.993) *0.5+(0.0029)*2+(0.0043)*5=0.5238. This quantity is the expected value of the signal; the noise, defined as the observed value minus the predicted value, is therefore calculated to be 4.4762.

On the other hand, if the states are qualitative, a state x+1 can be characterized by the mode in the probability distribution, where the mode is defined as the most commonly occurring or most probable state. In this case, state A is the most probable value for S, since that state has the highest probability of occurrence. The signal in this example is assumed to be the center point of state A, or 0.5 units, and the noise is then calculated to be 4.5 units.

Analysis by the EMC$_2$ method does not depend upon the direction selected as +x. In other words, the calculations in Equations (1) and (2) are symmetric with respect to spatial direction. The calculations also make no assumptions about the noise, either about its magnitude or its distribution function. Therefore, the EMC$^2$ method enables the estimation of the signal and the quantification of the uncertainty in that signal without such assumptions.

The above discussion has focused on one-dimensional data. The EMC$^2$ method readily extends to two or three spatial dimensions and to three spatial dimensions plus a time dimension, under the assumption that the values surrounding S are at least conditionally independent, given the value at S. For three dimensions, the analog of Equation (2) is $$Pr(S \mid \text{neighbors}) \propto \frac{\tau_{aS}\tau_{Sb}\beta_{aS}\beta_{Sb}\gamma_{aS}\gamma_{Sb}}{f^2(S)}. \quad (3)$$

Here the three chains are designated as $\tau$, $\beta$, and $\gamma$, for the +x, +y, and +z directions, respectively, with the neighbors' states designated as a and b. The latter can represent different states for each of the three directions. Thus, $\tau$, $\beta$, and $\gamma$ all indicate transition probabilities, as defined above for $\tau_{i,j}$. The factor $f^2(S)$ can be estimated by the frequency of occurrence of state S in the seismic data set or can be interpreted as a prior probability. Approaches for estimation of this factor will be understood to those skilled in the art.

Similarly, if a particular subsurface region is repeatedly surveyed over time by seismic methods, then the time coordinate may function as another axis along which a Markov chain could be constructed and applied to estimate the state in a given volume element at a given time.

The EMC$^2$ method also enables the generation of alternative data value realizations that are consistent with the observed data values up to the level of the observed noise. In three dimensions, the equation needed to generate a realized data value at a data location, given the realized data values of adjacent data locations in the −x, −y, and −z directions, is $$Pr(S \mid uvw) \propto \frac{\tau_{us}\beta_{vs}\gamma_{ws}}{\pi^2(S)}. \quad (4)$$

Here u, v, and w are the previously realized data values in the −x, −y, and −z directions, respectively and S indicates the value to be realized. The term $\pi(S)$ is a prior probability. As with the factor $f^2(S)$ in Equation (3), persons skilled in the art of Bayesian statistical analysis will understand the considerations to be used in estimating this prior probability. Similar equations apply when either fewer or additional values have been realized in the vicinity of S. Persons skilled in the art will also understand the extension of the above analysis to such applications.

If this prior probability distribution $\pi(S)$ is taken to be uniform, then the data value realizations given by Equation (4) will be essentially of the type that was described in the discussion of the example Markov chain 201 in FIG. 7. The data value realizations will have a statistically identical underlying Markov chain transition probability matrix 207, and therefore frequency of occurrences for the states, but will not directly correspond to the specific seismic attribute observations from which the transition probability matrix 207 was built. For example, the transition probability matrix 207 from FIG. 7 can be used to generate the succession (random data value realization) "b c c a b a b c b." Outwardly, this chain does not resemble the original Markov chain 201 shown in FIG. 7, and therefore has little utility for analyzing the underlying seismic data set. However, if prior probabilities are calculated according to Equation (3), then the realization will also relate to the observed specific seismic data in the sense that any such realization provides an alternative interpretation of the observed data. This alternative interpretation allows for the fact that noise has introduced uncertainty into the ability to interpret the underlying data. The ability to develop realizations which are consistent with the underlying seismic dataset enables an analyst to consider alternative geologic and geophysical models for the region from which the seismic data was obtained, and thus provides an ability to consider alternative hydrocarbon development scenarios for any such region.

I claim:

1. A method for measuring probable object size and detecting probable connectivity between objects in noisy data volumes, said method comprising the steps of:
   a) subdividing the data volume into voxels, each voxel being represented by a single datum value;
   b) calculating a probability distribution of noise-free datum values for each voxel;
   c) randomly sampling each voxel's probability distribution to generate a noise-free datum value for such voxel, collectively comprising a noise-free data volume;
   d) determining regions within the noise-free data volume of step (c) wherein each voxel in said region satisfies a pre-selected eligibility criterion and no voxel adjoining said region satisfies said criterion; and
   e) repeating steps (c)–(d) until the distribution of the resulting realizations satisfies a selected stopping condition.

2. The method of claim 1, wherein said probability distribution is developed by deriving a model of the noise in said data.

3. The method of claim 2, wherein said probability distribution is calculated by the Enhanced Markov Chain Characterization method which is then used to generate the random realizations in step (c).

4. The method of claim 1, wherein said data are seismic amplitude data.

5. The method of claim 1, wherein said data are seismic attribute data.

6. The method of claim 1, wherein said data are seismic-facies characterizations.

7. The method of claim 1, wherein said eligibility criterion is expressed in terms of a mathematical inequality which the datum value must satisfy.

8. The method of claim 1, wherein the noise-free data from step (c) are calculated to take spatial correlation into account.

9. A method for measuring probable object size and detecting probable connectivity between objects in noisy data volumes, said method comprising the steps of:
   a) subdividing the data volume into voxels, each voxel being represented by a single datum value;
   b) inspecting a visualization display of the data volume and selecting an object of interest;
   c) specifying a starting voxel within said object;
   d) selecting an eligibility criterion that is satisfied by said starting voxel, said criterion determining which neighboring voxels are eligible to be included in the same object with said starting voxel;
   e) calculating a probability distribution of noise-free datum values for each voxel, said probability distributions being developed by deriving a model of the noise in said data;
   f) constructing a tally cube having the same dimensions as the data volume and subdivided into the same voxels, said tally cube entries all initially set to zero;
   g) constructing a size vector to record the number of connected voxels in each realization;
   h) generating a random noise-free realization of the original data volume by randomly sampling each voxel's probability distribution and using such sampled probabilities to generate a noise-free datum value for each voxel, collectively comprising a noise-free data volume realization;
   i) performing a region-growing operation in the noise-free data volume realization from step (h), beginning at said starting voxel and using the selected eligibility criterion, registering each selected voxel in the tally cube and registering the size of the ultimate object resulting from said region-growing operation in said size vector;
   j) repeating steps (h) and (i) until a selected stopping condition is met; and
   k) using the tally cube to estimate the probability that each voxel is connected to the starting voxel, and using the size vector to provide the probability distribution for the size of the object.

10. The method of claim 9, wherein the probability distribution is calculated in step (e) by the Enhanced Markov Chain Characterization method which is then used to generate the random realizations in step (h).

11. The method of claim 9, wherein said data are seismic amplitude data.

12. The method of claim 9, wherein said data are seismic attribute data.

13. The method of claim 9, wherein said data are seismic facies characterizations.

14. The method of claim 9, wherein said eligibility criterion is expressed in terms of a mathematical inequality which the datum value must satisfy.

15. The method of claim 9, where in the random realizations from step (h) are calculated to take spatial correlations into account.

16. The method of claim 9, wherein steps (h) and (i) are performed in conjunction, such that a voxel is not realized until it is adjacent to the growing object.

17. The method of claim 9, wherein said method is automated to be performed on a computer, said computer containing multiple processors, and wherein the calculations in steps (e) and (h) and the iterations in step (j) are performed in parallel on said multiple processors.

* * * * *